United States Patent
Lee et al.

(10) Patent No.: US 9,634,815 B2
(45) Date of Patent: Apr. 25, 2017

(54) METHOD AND DEVICE FOR TERMINAL TO EXECUTE UPLINK HARQ OPERATION IN WIRELESS COMMUNICATION SYSTEM

(75) Inventors: Seungmin Lee, Anyang-si (KR); Hakseong Kim, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 213 days.

(21) Appl. No.: 14/117,008

(22) PCT Filed: May 3, 2012

(86) PCT No.: PCT/KR2012/003473
§ 371 (c)(1),
(2), (4) Date: Nov. 11, 2013

(87) PCT Pub. No.: WO2012/157869
PCT Pub. Date: Nov. 22, 2012

(65) Prior Publication Data
US 2014/0064237 A1     Mar. 6, 2014

Related U.S. Application Data

(60) Provisional application No. 61/486,751, filed on May 16, 2011.

(51) Int. Cl.
*H04L 5/00* (2006.01)
*H04W 72/04* (2009.01)
*H04L 1/18* (2006.01)

(52) U.S. Cl.
CPC .......... *H04L 5/0055* (2013.01); *H04L 1/1861* (2013.01); *H04W 72/0406* (2013.01)

(58) Field of Classification Search
USPC ......................................................... 370/329
See application file for complete search history.

(56) References Cited

U.S. PATENT DOCUMENTS

2007/0253370 A1* 11/2007 Khan ........................ H04L 1/04
370/331
2010/0135235 A1*  6/2010 Ji ......................... H04W 72/082
370/329

(Continued)

OTHER PUBLICATIONS

LG Electronics Inc., "UL control channel design to support carrier aggregation", 3GPP TSG RAN WG1 #56bis, R1-091204, Mar. 2009, 6 pages.

(Continued)

*Primary Examiner* — Charles C Jiang
*Assistant Examiner* — Kyaw Z Soe
(74) *Attorney, Agent, or Firm* — Lee Hong Degerman Kang Waimey

(57) ABSTRACT

Disclosed in the present invention is a method for a terminal to receive an acknowledgement/negative-ACK (ACK/NACK) from a base station in a wireless communication system. More specifically, the method comprises the steps of receiving from the base station, through a first carrier wave, scheduling information on uplink data to be transmitted through a second carrier wave, transmitting the uplink data to the base station through the second carrier wave, and receiving an ACK/NACK signal for the uplink data from the base station, in one specific subframe from the first carrier wave or the second carrier wave.

14 Claims, 14 Drawing Sheets

(56) References Cited

U.S. PATENT DOCUMENTS

| | | | |
|---|---|---|---|
| 2010/0254268 A1 | 10/2010 | Kim et al. | |
| 2011/0064037 A1* | 3/2011 | Wei | H04L 5/0035 370/329 |
| 2011/0105050 A1* | 5/2011 | Khandekar | H04L 5/001 455/68 |
| 2011/0170508 A1* | 7/2011 | Xue | H04L 5/0055 370/329 |
| 2011/0255484 A1* | 10/2011 | Zhang | H04L 5/001 370/329 |
| 2011/0268059 A1* | 11/2011 | Li | H04W 72/0446 370/329 |
| 2012/0069815 A1* | 3/2012 | Aiba | H04L 5/001 370/329 |
| 2012/0082145 A1* | 4/2012 | Chen | H04L 1/0029 370/338 |
| 2012/0113941 A1* | 5/2012 | Chung | H04W 72/1289 370/329 |
| 2012/0236771 A1* | 9/2012 | Luo | H04L 1/1607 370/311 |
| 2012/0257554 A1* | 10/2012 | Kim | H04L 5/001 370/280 |
| 2012/0300738 A1* | 11/2012 | Palanki | H04L 5/0053 370/329 |
| 2012/0300743 A1* | 11/2012 | Kim | H04L 5/0091 370/329 |
| 2014/0064237 A1* | 3/2014 | Lee | H04L 5/0055 370/329 |
| 2014/0254522 A1* | 9/2014 | Aiba | H04L 5/001 370/329 |
| 2015/0043493 A1* | 2/2015 | Gajanan et al. | 370/329 |

OTHER PUBLICATIONS

Interdigital, "Multiple Component Carriers and Carrier Indication", 3GPP TSG-RAN WG1 Meeting #57bis, R1-092589, Jun. 2009, 5 pages.

PCT International Application No. PCT/KR2012/003473, Written Opinion of the International Searching Authority dated Nov. 28, 2012, 19 pages.

* cited by examiner

FIG. 2
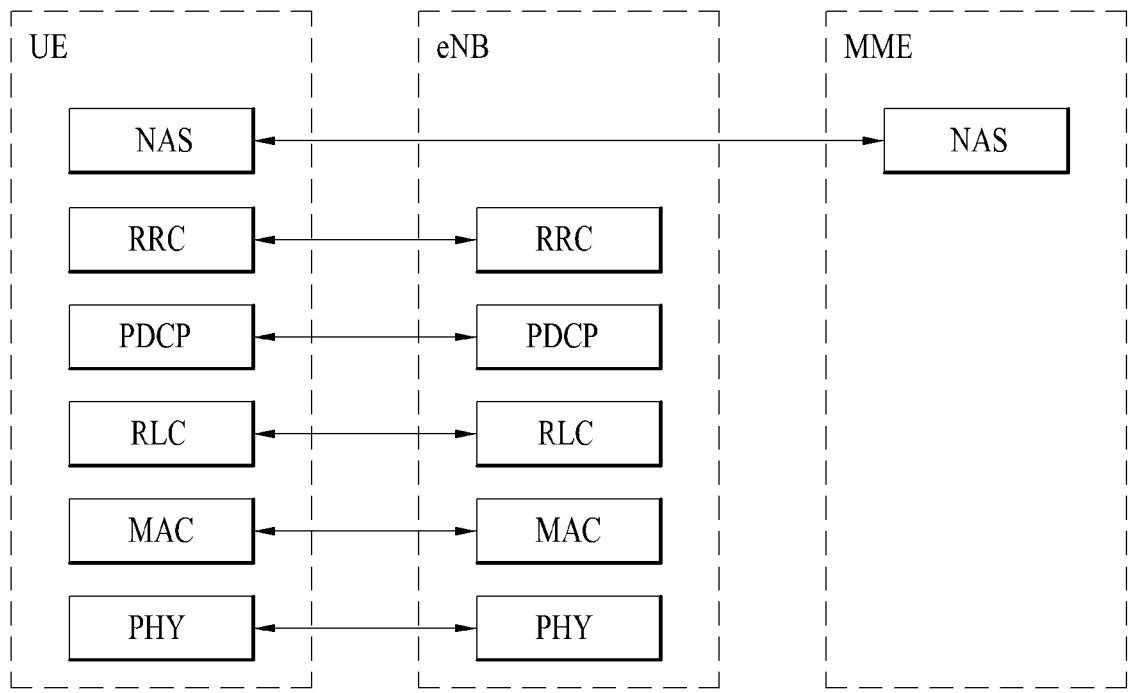
(a) contol - plane protocol stack
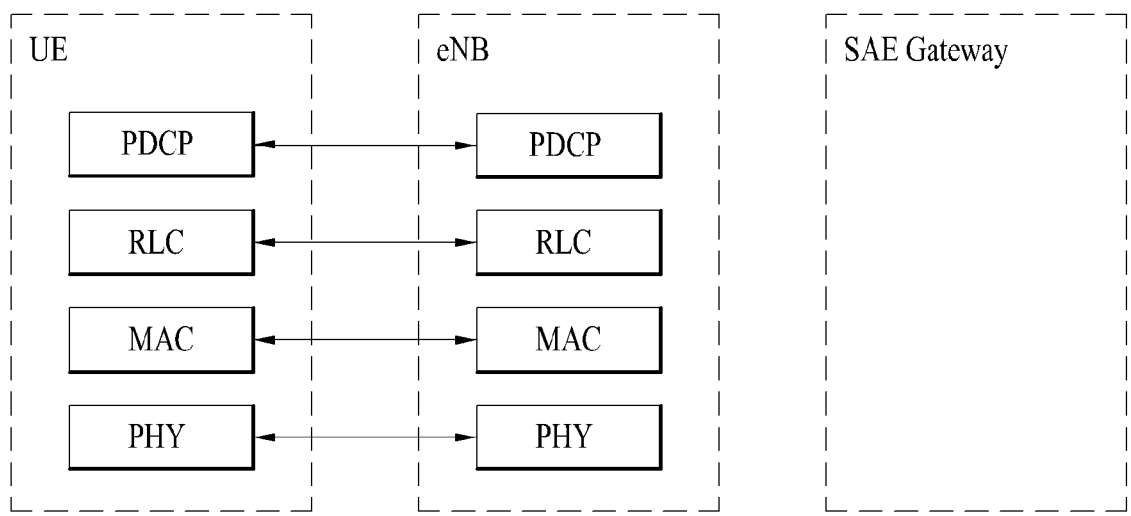
(b) user - plane protocol stack

METHOD AND DEVICE FOR TERMINAL TO EXECUTE UPLINK HARQ OPERATION IN WIRELESS COMMUNICATION SYSTEM

CROSS-REFERENCE TO RELATED APPLICATIONS

This application is the National Stage filing under 35 U.S.C. 371 of International Application No. PCT/KR2012/003473, filed on May 3, 2012, which claims the benefit of U.S. Provisional Application Ser. No. 61/486,751, filed on May 16, 2011, the contents of which are hereby incorporated by reference herein in their entirety.

TECHNICAL FIELD

The present invention relates to a wireless communication system, and more particularly, to a method and device for allowing a user equipment to execute uplink hybrid automatic repeat and request (HARQ) operation in a wireless communication system.

BACKGROUND ART

A $3^{rd}$ generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), a base station (eNode B; eNB), and an Access Gateway (AG) which is located at an end of a network (E-UTRAN) and connected to an external network. Generally, the base station may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, the base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

DISCLOSURE

Technical Problem

Based on aforementioned discussion, an object of the present invention devised to solve the conventional problem is to provide a method and device for allowing a user equipment to execute uplink hybrid automatic repeat and request (HARQ) operation in a wireless communication system.

Technical Solution

In one aspect of the present invention, a method for receiving an acknowledgement/negative-ACK (ACK/NACK) signal from a base station at a user equipment in a wireless communication system comprises receiving, from the base station, through a first carrier, scheduling information on uplink data to be transmitted through a second carrier; transmitting the uplink data to the base station through the second carrier; and receiving an ACK/NACK signal for the uplink data from the base station, for one specific subframe of the first carrier or the second carrier.

Preferably, the receiving an ACK/NACK signal includes receiving the ACK/NACK signal on the first carrier if the specific subframe of the first carrier is an available subframe; and receiving the ACK/NACK signal on the second carrier if the specific subframe of the first carrier is not an available subframe.

More preferably, the receiving an ACK/NACK signal includes receiving the ACK/NACK signal for the uplink data on the second carrier if the specific subframe of the first carrier is an almost blank subframe (ABS). In this case, the ACK/NACK signal is received in a data region of the specific subframe on the second carrier or received in a control region of the specific subframe on the second carrier.

Moreover, the method may further comprise receiving information on a timing when the ACK/NACK signal will be received for the specific subframe on the second carrier, from the base station.

In another aspect of the present invention, a method for transmitting an acknowledgement/negative-ACK (ACK/NACK) signal to a user equipment at a base station in a wireless communication system comprises transmitting, to the user equipment, through a first carrier, scheduling information on uplink data to be transmitted through a second carrier; receiving the uplink data from the user equipment through the second carrier; and transmitting an ACK/NACK signal for the uplink data to the user equipment, for one specific subframe of the first carrier or the second carrier.

Preferably, the transmitting an ACK/NACK signal includes transmitting the ACK/NACK signal on the first carrier if the specific subframe of the first carrier is an available subframe; and transmitting the ACK/NACK signal on the second carrier if the specific subframe of the first carrier is not an available subframe.

More preferably, the transmitting an ACK/NACK signal includes transmitting the ACK/NACK signal for the uplink data on the second carrier if the specific subframe of the first carrier is an almost blank subframe (ABS).

Also, the method may further comprise transmitting information on a timing when the ACK/NACK signal will be received for the specific subframe on the second carrier, to the user equipment.

In still another aspect of the present invention, a method for receiving an acknowledgement/negative-ACK (ACK/NACK) signal from a base station in a wireless communication system comprises receiving, from the base station, through a first carrier, scheduling information on uplink data to be transmitted through a second carrier; transmitting the uplink data to the base station through the second carrier; and receiving an ACK/NACK signal for the uplink data from the base station, for a specific subframe of a third first carrier which is previously set. In this case, the third carrier is an available subframe and has a minimum carrier index.

Moreover, in further still another aspect of the present invention, a method for receiving an acknowledgement/negative-ACK (ACK/NACK) signal from a base station in a wireless communication system comprises receiving, from the base station, through a first carrier, scheduling information on uplink data to be transmitted through a second carrier; transmitting the uplink data to the base station through the second carrier; and receiving an ACK/NACK signal for the uplink data from the base station, for a specific subframe of the first carrier if the specific subframe of the first carrier is an available subframe, and assuming the ACK/NACK signal for the uplink data as an ACK signal without receiving the ACK/NACK signal for the uplink data if the specific subframe is not an available subframe. In this case, the method may further comprise reporting the ACK/NACK signal for the uplink data to an upper layer as the ACK signal if the specific subframe is not the available subframe.

Advantageous Effects

According to the embodiments of the present invention, the user equipment may efficiently perform HARQ operation in the wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 2 is a diagram illustrating structures of a control plane and a user plane of a radio interface protocol between a user equipment and an E-UTRAN based on the 3GPP radio access network standard;

BEST MODE FOR CARRYING OUT THE INVENTION

Figure 1:
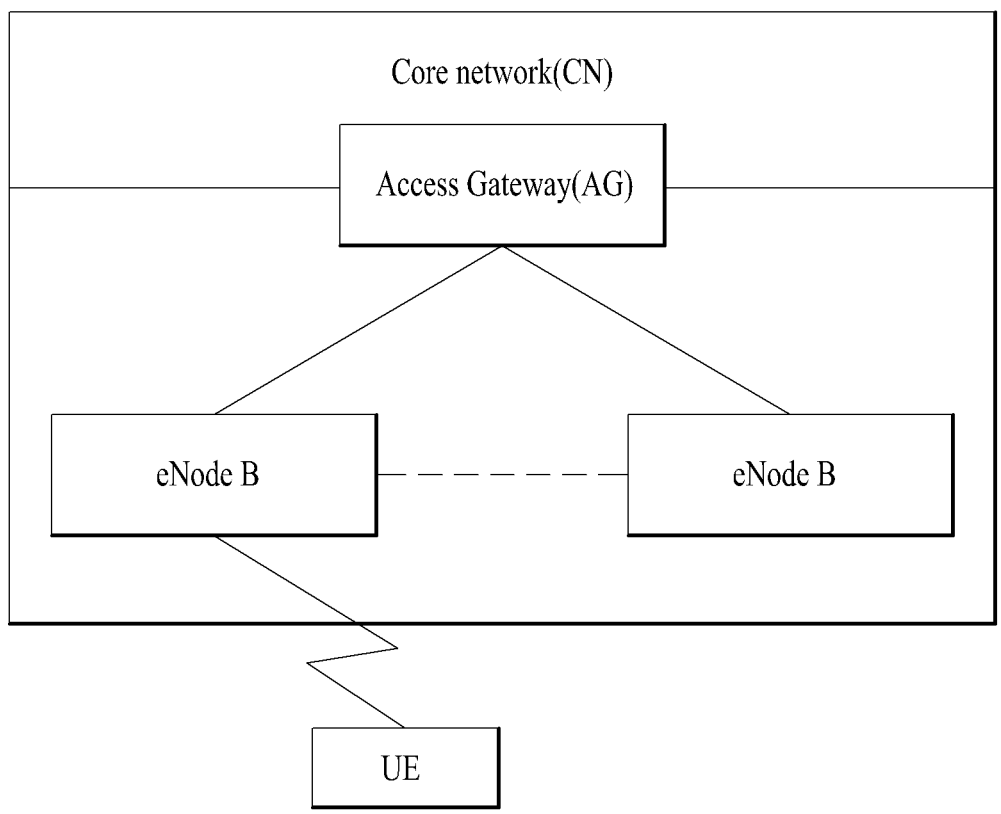
FIG. 1 is a diagram illustrating a network structure of an Evolved Universal Mobile Telecommunications System (E-UMTS), which is an example of a wireless communication system.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
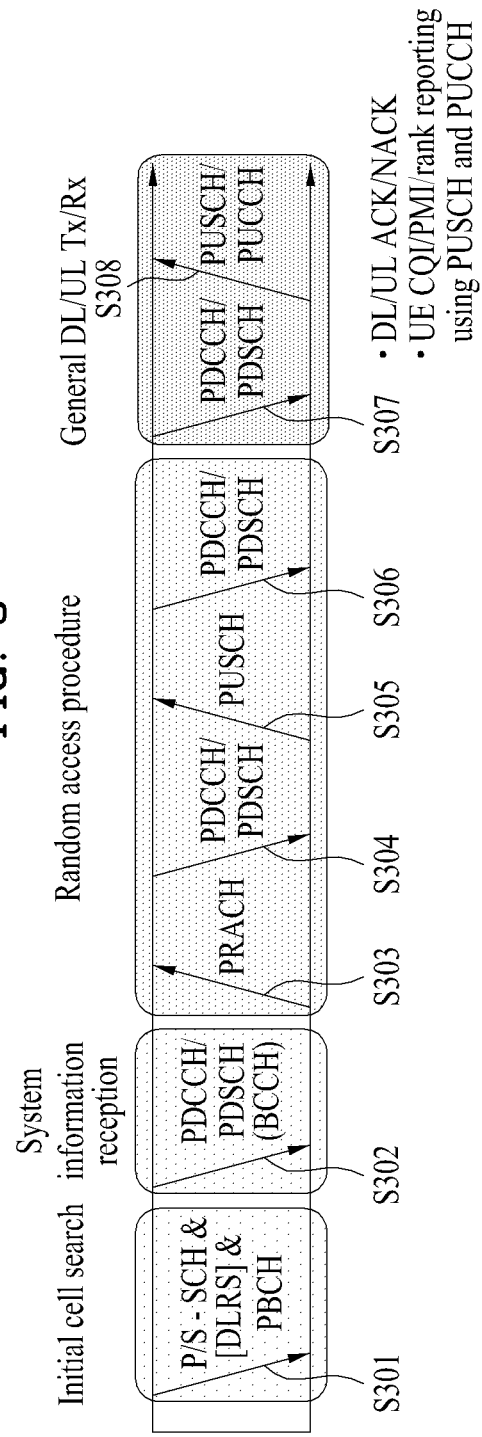
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station. In the mean time, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

In the meantime, if the user equipment initially accesses the base station, or if there is no radio resource for signal transmission, the user equipment may perform a random access procedure (RACH) for the base station (S303 to S306). To this end, the user equipment may transmit a preamble of a specific sequence through a physical random access channel (PRACH) (303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps may receive the PDCCH/PDSCH (S307) and transmit a physical uplink shared channel (PUSCH) and a physical uplink control channel (PUCCH) (S308), as a general procedure of transmitting uplink/downlink signals. In particular, the user equipment receives downlink control information (DCI) through the PDCCH. In this case, the DCI includes control information such as resource allocation information on the user equipment, and has different formats depending on its usage.

In the meantime, the control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 4:
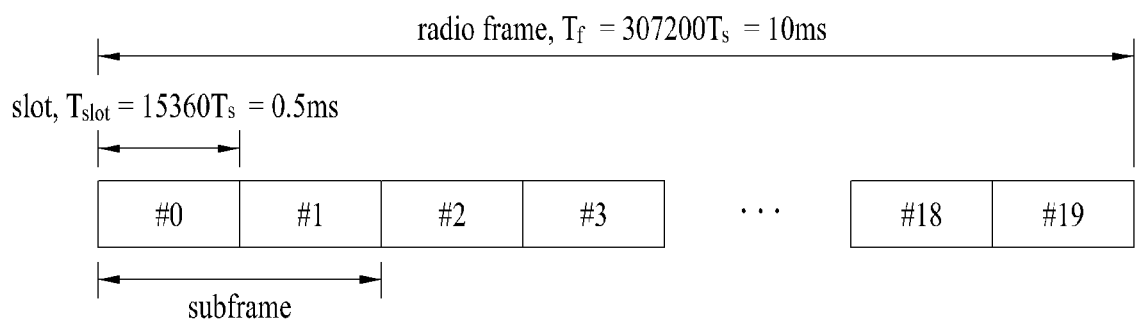
FIG. 4 is a diagram illustrating a structure of a radio frame used in an LTE system.

FIG. 4 is a diagram illustrating a structure of a radio frame used in an LTE system.

Referring to FIG. 4, a radio frame has a length of 10 ms ($327200 \times T_s$) and includes ten (10) subframes of an equal size. Each sub frame has a length of 1 ms and includes two slots. Each slot has a length of 0.5 ms ($15360T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain. In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

Figure 5:
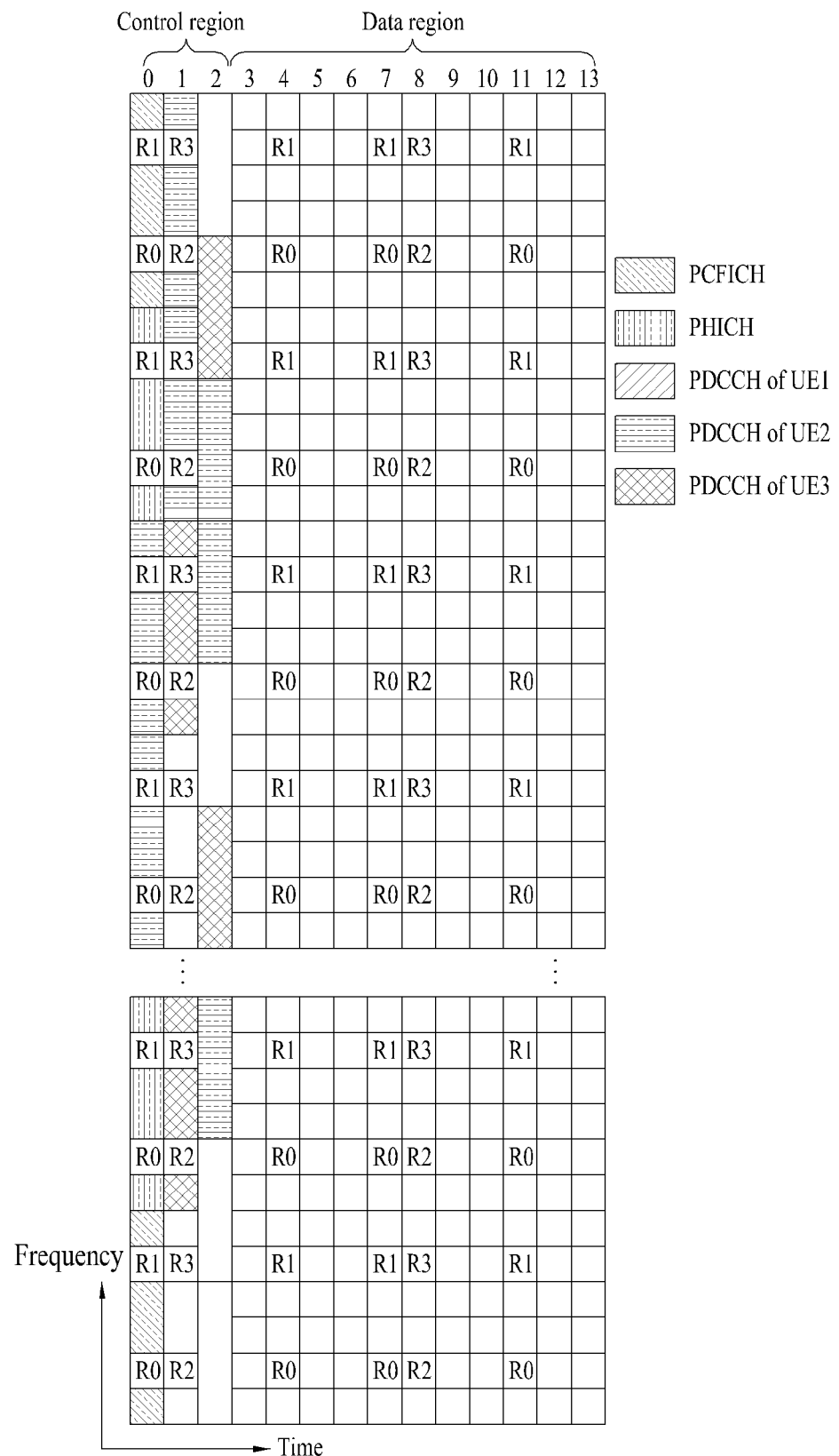
FIG. 5 is a diagram illustrating a structure of a downlink radio frame used in an LTE system.

FIG. 5 is a diagram illustrating a control channel included in a control region of one subframe in a downlink radio frame.

Referring to FIG. 5, the subframe includes fourteen (14) OFDM symbols. First one to three OFDM symbols are used as the control region in accordance with subframe configuration, and the other thirteen to eleven OFDM symbols are used as the data region. In FIG. 5, R0 to R3 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and configured prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to carry HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH by using their RNTI information, and if there are one or more user equipments having RNTI called "A", the user equipments receive the PDCCH, and receive the PDSCH indicated by "B" and "C" through information of the received PDCCH.

Figure 6:
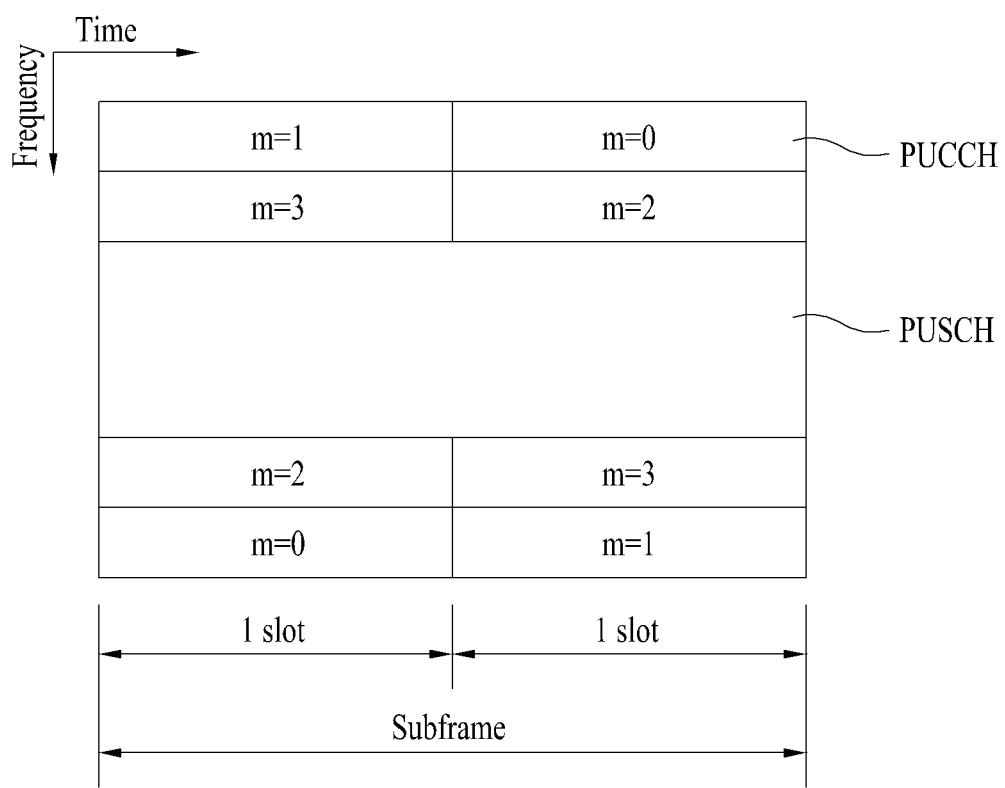
FIG. 6 is a diagram illustrating a structure of an uplink radio frame used in an LTE system.

FIG. 6 is a diagram illustrating a structure of an uplink subframe used in an LTE system.

Referring to FIG. 6, the uplink subframe may be divided into a region to which a physical uplink control channel (PUCCH) carrying control information is allocated, and a region to which a physical uplink shared channel (PUSCH) carrying user data is allocated. The center part of the subframe is allocated to the PUSCH, and both parts of the data region in the frequency domain are allocated to the PUCCH. Examples of the control information transmitted on the PUCCH include ACK/NACK used for HARQ, a channel quality indicator (CQI) indicating the status of a downlink channel, a rank indicator (RI) for MIMO, and a scheduling request (SR) corresponding to uplink resource allocation request. The PUCCH for one user equipment uses one resource block that occupies different frequencies in each slot within the subframe. Namely, two resource blocks allocated to the PUCCH are subjected to frequency hopping in the boundary of the slots. Particularly, FIG. 6 exemplarily illustrates that PUCCH of m=0, PUCCH of m=1, PUCCH of m=2, and PUCCH of m=3 are allocated to the subframe.

The present invention suggests efficient HARQ operation if eNB dynamically changes a specific radio resource (for example, downlink resource or uplink resource), which is allocated to UE, for downlink or uplink in accordance with change of traffic load.

First of all, before the detailed description of the suggestion is made, uplink-downlink configuration defined in a 3GPP LTE system based TDD system will be described.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D, U and S allocated to each of subframe numbers represent a downlink subframe, an uplink subframe and a special subframe, respectively. Also, the following Table 2 illustrates uplink subframe numbers (indexes) for transmitting uplink ACK/NACK for a corresponding downlink signal from UE in a 3GPP LTE system based TDD system.

TABLE 2

| UL-DL Configuration | subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |

TABLE 2-continued

| UL-DL Configuration | subframe number | | | | | | | | | |
|---|---|---|---|---|---|---|---|---|---|---|
| | 0 | 1 | 2 | 3 | 4 | 5 | 6 | 7 | 8 | 9 |
| 5 | 2 | 2 | — | 2 | 2 | 2 | 2 | 2 | 2 | 2 |
| 6 | 7 | 8 | — | — | — | 2 | 3 | — | — | 4 |

In particular, in Table 2, '-' represents that the uplink subframe has been set, and a number allocated to each of subframe numbers represents an uplink subframe index, that is, an uplink subframe index linked to the corresponding downlink subframe.

Table 2 may be expressed by the following Table 3. The following Table 3 illustrates a subframe n for which uplink ACK/NACK is transmitted. In other words, ACK/NACK for a downlink signal received for a subframe n-K is fed back for the subframe n, and the following Table 3 illustrates a value of the K.

TABLE 3

| UL-DL Config- uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 7:
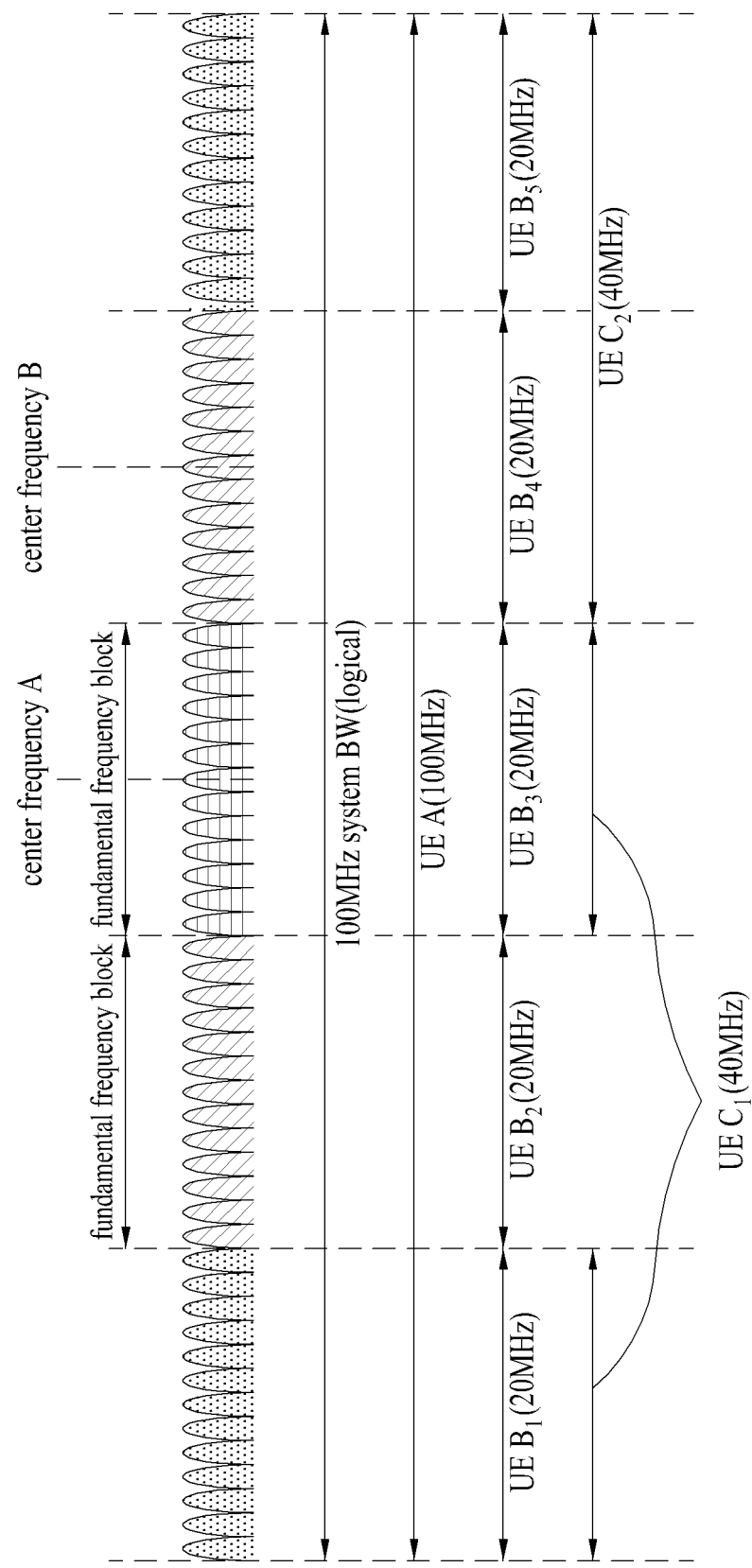
FIG. 7 is a conceptional diagram illustrating a carrier aggregation scheme.

Hereinafter, a carrier aggregation scheme will be described. FIG. 7 is a conceptional diagram illustrating a carrier aggregation scheme.

The carrier aggregation means that the user equipment uses a plurality of frequency blocks or (logical) cells, which include uplink resources (or component carriers) and/or downlink resources (or component carriers), as one large logical frequency band to enable a wireless communication system to use a wider frequency band. Hereinafter, for convenience of description, the carrier aggregation will be referred to as component carriers.

Referring to FIG. 7, a whole system bandwidth (system BW) is a logical band and has a bandwidth of 100 MHz. The whole system bandwidth includes five component carriers, each of which has a bandwidth of maximum 20 MHz. The component carrier includes at least one or more physically continuous subcarriers. Although the respective component carriers have the same bandwidth in FIG. 7, it is only exemplary, and the component carriers may have their respective bandwidths different from one another. Also, although the respective component carriers adjoin each other in the frequency domain as shown, the drawing just represents the logical concept. The respective component carriers may logically adjoin each other, or may be spaced apart from each other.

A center frequency may be used differently for each of the component carriers. Alternatively, one center carrier common for physically adjoining component carriers may be used. For example, assuming that all component carriers are physically adjacent to one another in FIG. 7, a center carrier 'A' may be used. Assuming a case that the respective component carriers are not physically adjacent to each other, a center carrier 'A' for one component carrier, a center carrier 'B' for another component carrier, and the like may be used.

In this specification, a component carrier may correspond to a system bandwidth of a legacy system. By defining a component carrier based on a legacy system, it is possible to facilitate provision of backward compatibility and system design in a wireless communication environment in which an evolved user equipment and a legacy user equipment coexist. For example, in case that the LTE-A system supports carrier aggregation, each component carrier may correspond to a system bandwidth of the LTE system. In this case, the component carrier may have a bandwidth selected from the group including 1.25 MHz, 2.5 MHz, 5 MHz, 10 MHz and 20 MHz.

In case that a whole system band is extended by carrier aggregation, a frequency band used for communication with each user equipment is defined by a component carrier unit. A user equipment A may use a whole system bandwidth of 100 MHz and performs communication using five component carriers all. User equipments $B_1$ to $B_5$ may use a bandwidth of 20 MHz only, and each of the user equipments $B_1$ to $B_5$ performs communication using one component carrier. User equipment $C_1$ and user equipment $C_2$ may use a bandwidth of 40 MHz. Each of the user equipment $C_1$ and the user equipment $C_2$ performs communication using two component carriers. In this case, these two component carriers may be logically/physically adjacent to each other or may not. The user equipment $C_1$ represents a case of using two component carriers that are not adjacent to each other. And, the user equipment $C_2$ represents a case that two adjacent component carriers are used.

Figure 11:
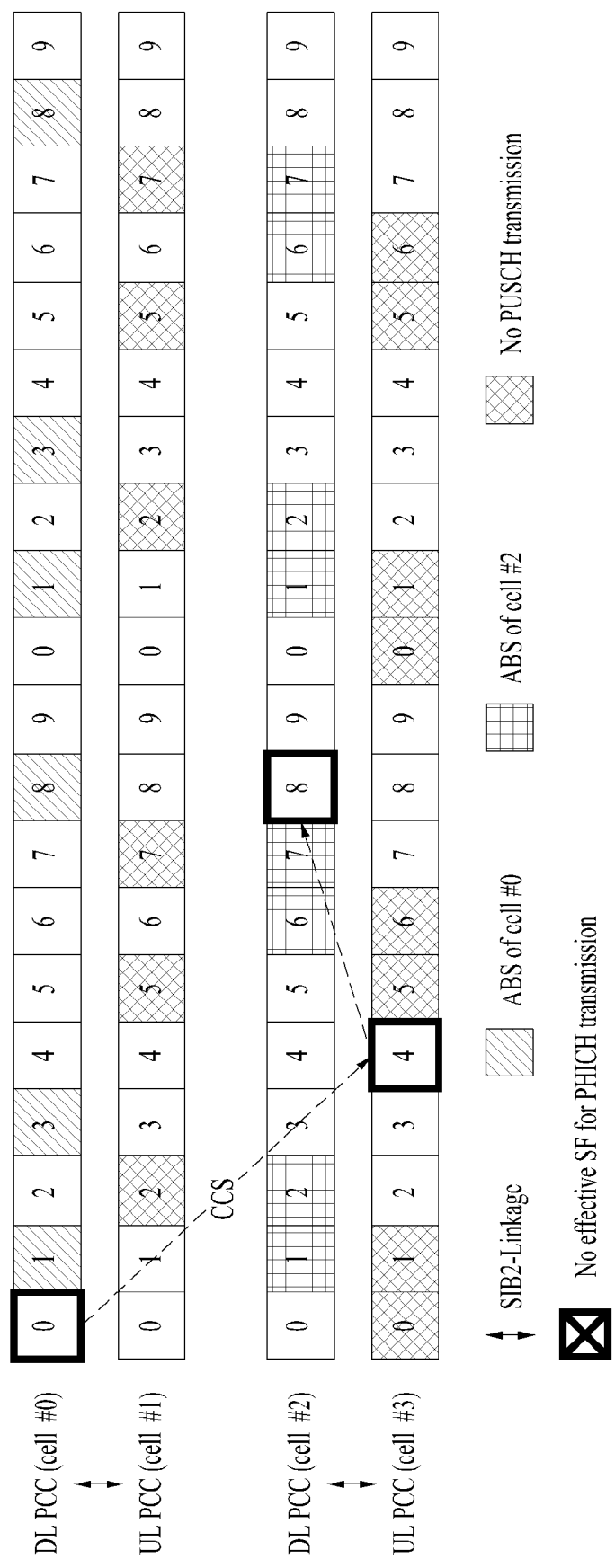
FIG. 11 is a diagram illustrating a method for HARQ operation according to the second embodiment of the present invention.

One downlink component carrier and one uplink component carrier are used in the LTE system, whereas several component carriers may be used in the LTE-A system as shown in FIG. 11. At this time, a scheme of scheduling a data channel through a control channel may be divided into a linked carrier scheduling scheme of the related art and a cross carrier scheduling (CCS) scheme.

In more detail, according to the linked carrier scheduling scheme, like the existing LTE system that uses a single component carrier, a control channel transmitted through a specific component carrier performs scheduling for a data channel only through the specific component carrier.

In the mean time, according to the cross carrier scheduling scheme, a control channel transmitted through a primary component carrier (CC) using a carrier indicator field (CIF) performs scheduling for a data channel transmitted through the primary component carrier or another component carrier.

Figure 8:
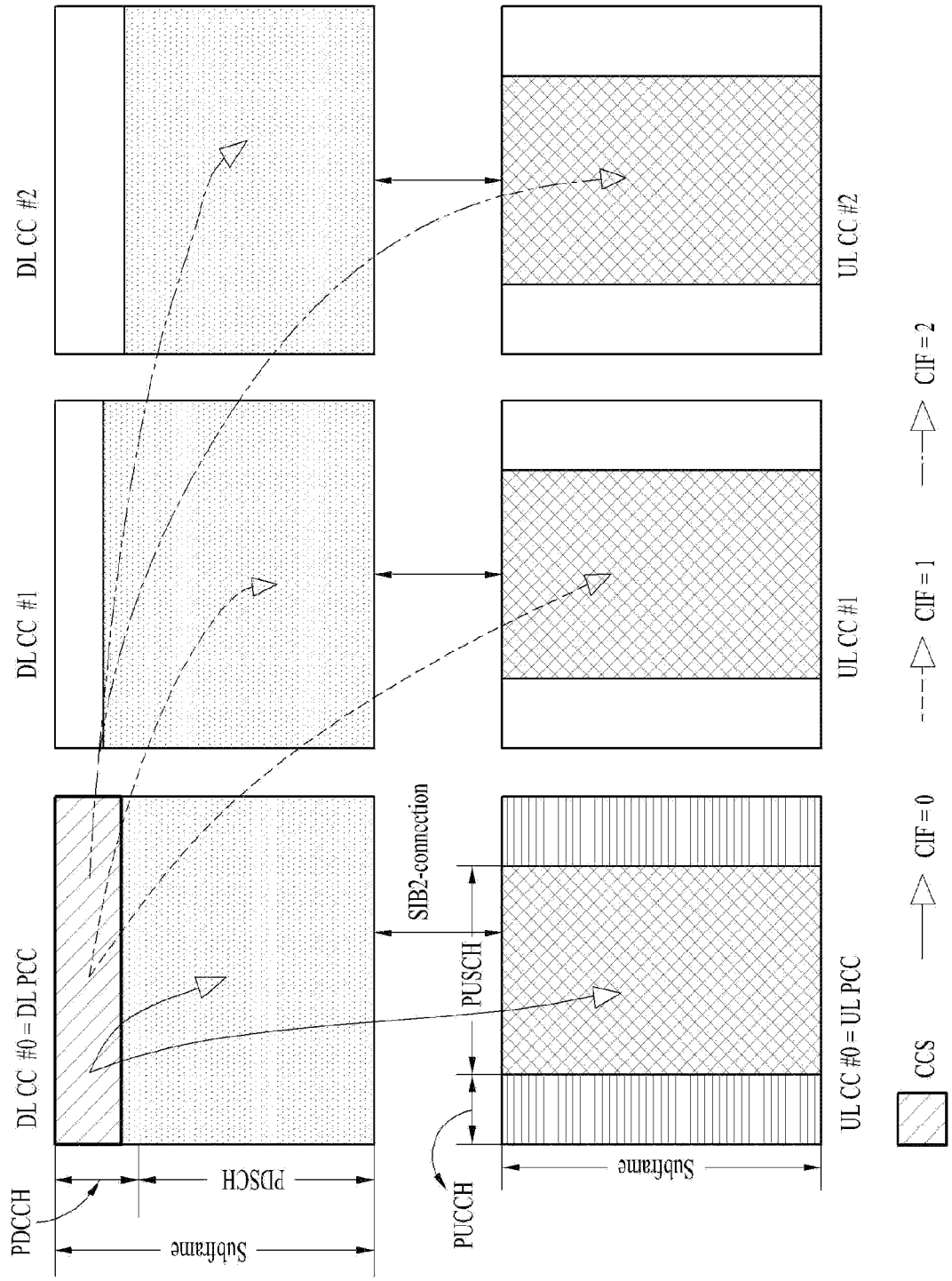
FIG. 8 is a diagram illustrating an example of a cross carrier scheduling scheme.

FIG. 8 is a diagram illustrating an application example of a cross carrier scheduling scheme. In particular, in FIG. 8, the number of cells (or component carriers) allocated to the user equipment is three, and the cross carrier scheduling scheme is performed using CIF as described above. In this case, it is assumed that a downlink cell (or component carrier) #0 and an uplink cell (or component carrier) #0 are a primary downlink component carrier (i.e., primary cell (PCell)) and a primary uplink component carrier, respectively. It is also assumed that the other component carriers are secondary component carriers (i.e., secondary cell (SCell)).

In the LTE-A system, studies on enhanced inter cell interference coordination (eICIC) to reduce interference between a first base station eNB1 and a second base station eNB2 in a heterogeneous network (HetNet) are in progress. A representative example of the studies includes almost black subframe (ABS), and a subframe designated as the ABS is set to transmit CRS only.

Examples of a heterogeneous network considered by the LTE-A system include a macro cell to femto cell and a macro cell to pico cell. In the macro cell to femto cell, it is assumed that there is no information exchange through X2 interface which is an inter-cell interface. In the macro cell to pico cell, it is assumed that there is information exchange through X2 interface. For example, the macro cell may notify the pico cell of information on ABS configuration through the X2 interface.

Figure 9:
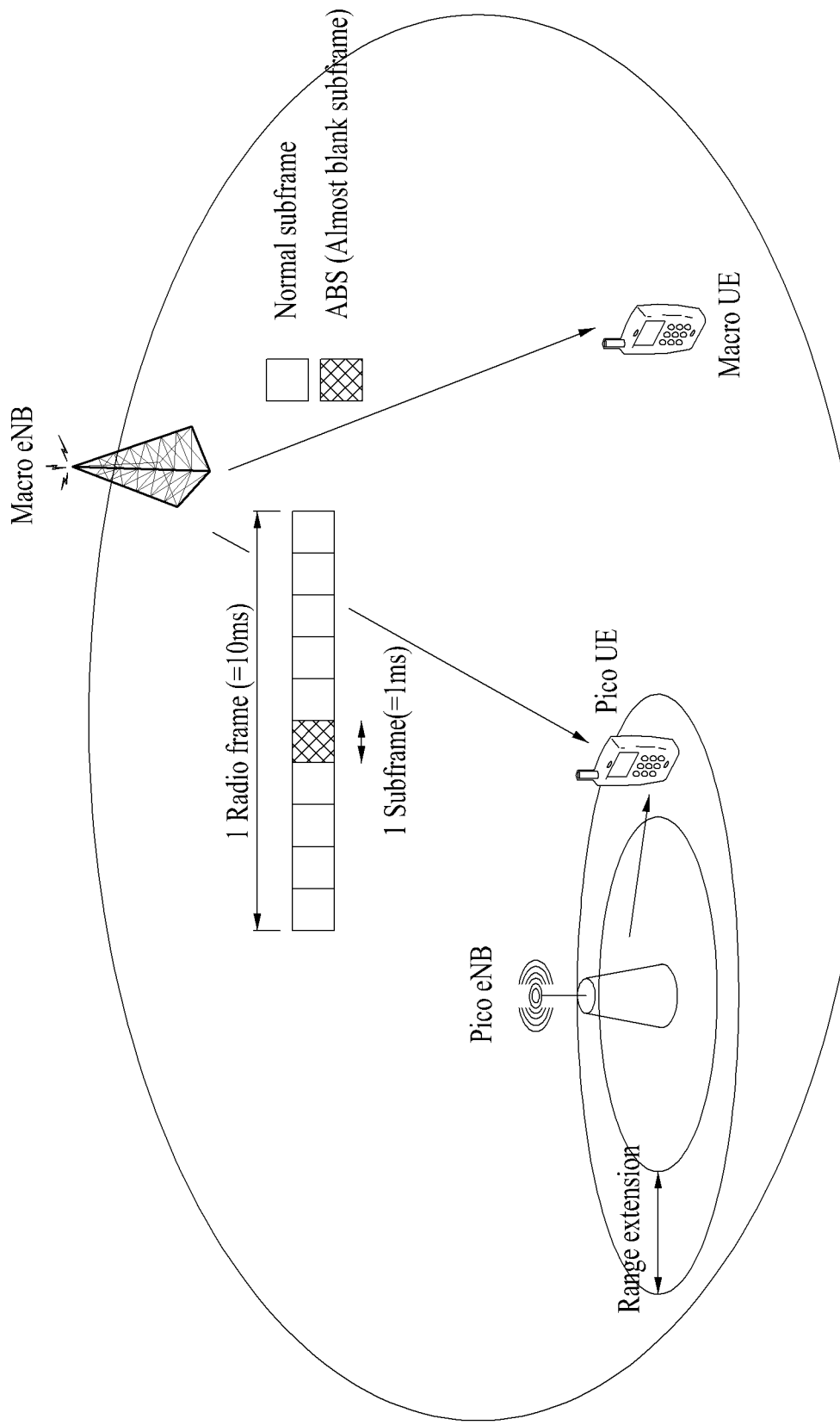
FIG. 9 is a diagram illustrating an application example of ABS in case of a macro cell to pico cell.

FIG. 9 is a diagram illustrating an application example of ABS in case of a macro cell to pico cell.

Referring to FIG. 9, range extension of the pico cell means that coverage of the pico cell is extended using received power offset, etc. Especially, in FIG. 9, it is assumed that a pico user equipment exists in the range extension region. In this case, since the pico user equipment has a signal weakened from eNB of the pico cell and interference enhanced from the macro cell, received performance from the pico cell is reduced due to interference from the eNB of the macro cell even without application of additional interference mitigation scheme.

Accordingly, as illustrated in FIG. 9, one or more of subframes transmitted from the eNB of the macro cell are designed as ABS, and the eNB of the pico cell may perform communication with the pico UE existing in the range extension region by using the corresponding subframe designated as the ABS. In this case, only signals of CRS/PSS/SSS/PBCH/SIBI/paging/PRS (positioning RS), which are previously designated, may be transmitted for the subframe set to the ABS.

In the meantime, in a wireless communication system to which a carrier aggregation scheme is applied, if ABS patterns are independently designated per cell (or component carrier), or if the same ABS pattern is designated for some cells (or component carriers) or ABS patterns are independently designated for the other cells (or component carriers), an operation for scheduling a PUSCH or PDSCH of SCells through cross carrier scheduling (CCS) at the PCell cannot be operated. This will be described in more detail with reference to FIG. 10.

Figure 10:
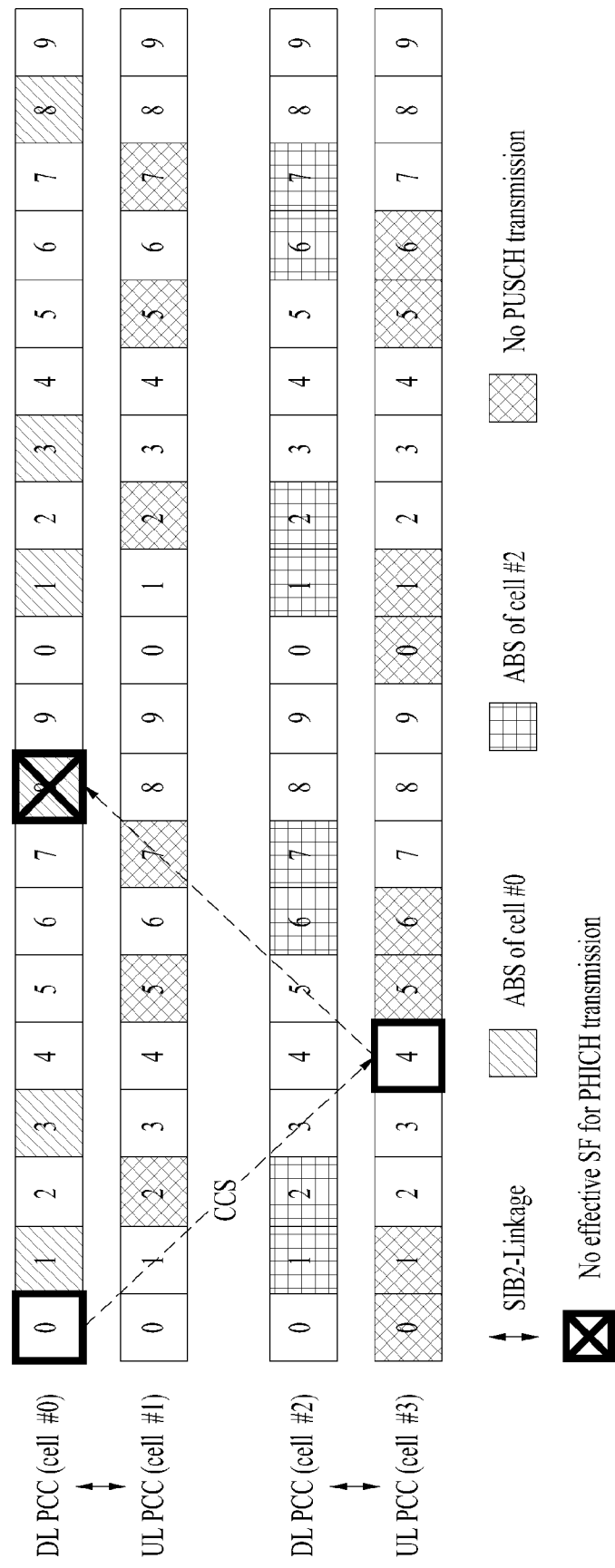
FIG. 10 is a diagram illustrating a problem of HARQ timing inconsistency under cross carrier scheduling.

FIG. 10 is a diagram illustrating a problem of HARQ timing inconsistency if ABS patterns are independently designated per cell (or component carrier) and PUSCH (or PDSCH) of another SCell is scheduled through cross carrier scheduling of the PCell.

Particularly, in FIG. 10, it is assumed that a corresponding PUSCH is transmitted for an uplink subframe (UL SF) #(n+4) (on the basis of UL grant received for DL SF #n) if UL grant is received for the downlink subframe (DL SF) #n in the FDD system. It is also assumed that MeNB performs scheduling for PUSCH of cell #3 (that is, CC #3) through cross carrier scheduling for DL SF #0 which is a non-ABS of cell #0 (that is, CC #0).

Referring to FIG. 10, under the environment that normal HARQ operation may be performed, the user equipment UE performs PUSH transmission through UL SF #4 of cell #3 (on the basis of UL grant received for DL SF #0 of cell #0) and then expects reception of a corresponding PHICH (or UL grant on PDCCH for channel adaptive UL communication or UL retransmission) for DL SF #8 of cell #0.

However, as DL SF #8 of cell #0 is set to ABS, the user equipment UE cannot receive a PHICH (or UL grant on PDCCH for channel adaptive UL communication or UL retransmission) for PUSCH transmitted for UL SF #4 of cell #3.

Accordingly, if ABS patterns per cell are designated independently from each other, or if the same ABS pattern is designated for some cells and different ABS patterns are designated independently for the other cells, a problem occurs in that HARQ timing inconsistency per cell (or between cells) occurs, whereby link carrier scheduling operation or cross carrier scheduling operation cannot be performed efficiently. Also, this problem may occur even in the TDD system where DL communication and UL communication of PCell are performed at the same band.

Accordingly, the present invention suggests a method for effectively solving HARQ timing inconsistency per cell, which is caused as ABS patterns per cell are not the same as each other. Hereinafter, the methods suggested hereinafter may be applied to the FDD system or TDD system to which a carrier aggregation scheme is applied.

First Embodiment

In the first embodiment of the present invention, under the circumstances that ABS patterns per cell are designated independently from each other in a wireless communication system to which a carrier aggregation scheme is applied, or the same ABS pattern is designated for some cells and different ABS patterns are designated independently for the other cells, if the PCell schedules a PUSCH (or PDSCH) of another SCell through cross carrier scheduling, the user equipment UE suggests to assume and receive a PHICH (or UL grant on PDCCH for channel adaptive UL communication or UL retransmission) for PUSCH transmission of the SCell transmitted through DL SF of the PCell, as follows.

If DL SF (for example, DL SF #n) of the PCell, to which a PHICH (or UL grant on PDCCH for channel adaptive UL communication or UL retransmission) for PUSCH of the SCell is transmitted, is set to ABS, the user equipment UE may report ACK to its upper layer after assuming that PUSCH transmission has been performed successfully without performing a PHICH (UL grant on PDCCH for channel adaptive UL communication or UL retransmission) decoding operation for a corresponding DL SF of the PCell. In other words, the user equipment UE performs an operation for halting associated UL HARQ process.

1) In this case, the eNB may notify the user equipment UE of related information (hereinafter, referred to as information V) through physical control channel (for example, specific field (for example, CIF or UL index) or additionally defined filed of the PDCCH) or physical data channel or upper layer signaling, whereby the user equipment UE may be operated as above for the corresponding DL SF (that is, DL SF #n), that is, may report ACK to its upper layer after assuming that PUSCH transmission has been performed successfully without performing a PHICH (or UL grant on PDCCH for channel adaptive UL communication or UL retransmission) decoding operation.

As an implementation example, the timing when the eNB transmits the information V to the user equipment UE through a previously designated channel may be the corresponding DL SF (for example, PDCCH (that is, UL grant) of the PCell transmitted for PUSCH scheduling information of the SCell for DL SF #i of the FDD system) of the PCell that schedules PUSCH (for example, PUSCH of the SCell transmitted for UL SF #(i+4) of the FDD system) of the SCell.

2) In another way, the eNB may previously notify the user equipment UE of information on SF set, which includes DL SF (for example, DL SF #n) of the PCell, which is set to ABS on the basis of ABS pattern per cell and DL SF (for example, DL SF #n) of the SCell located at the same time, which is set to non-ABS, or information (hereinafter, referred to as information W) on SF set, which includes DL SF (for example, DL SF #n) of the PCell, which is set to ABS, and DL SF (for example, DL SF #n) of the SCell located at the same time, which is set to ABS, through upper layer signaling or physical layer channel. For example, the information W may have a bitmap type.

Accordingly, the user equipment UE may know the operation timing in a way of the first embodiment on the basis of the information W, that is, the operation timing (for example, DL SF #n) in a way that the UE reports ACK to its upper layer after assuming that PUSCH transmission has been performed successfully without performing a PHICH (or UL grant on PDCCH for channel adaptive UL communication or UL retransmission) decoding operation for a corresponding DL SF of the PCell.

In this case, the timing when the eNB reconfigures or updates the existing information W for the UE may be limited to "the case where the existing information W is not effective any more as ABS pattern of a specific cell is changed", or "the case where the existing information W is not effective any more as a set of cells allocated to a specific UE is reconfigured."

3) In other way, the eNB may notify the user equipment UE of ABS pattern per cell through upper layer signaling, thereby notifying the UE of information on the operation timing in the way of the first embodiment.

Second Embodiment

In the wireless communication system to which a carrier aggregation scheme is applied, if ABS patterns per cell are designated independently from each other or the same ABS pattern is designated for some cells and different ABS patterns are designated independently for the other cells, and if the PCell schedules a PUSCH (or PDSCH) of another SCell through cross carrier scheduling, in the second embodiment of the present invention, the user equipment UE suggests to assume and receive a PHICH (or UL grant on PDCCH for channel adaptive UL communication or UL retransmission) for PUSCH transmission of the SCell transmitted through DL SF of the PCell, as follows.

A) If DL SF (for example, DL SF #n) of the PCell, to which a PHICH (or UL grant on PDCCH for channel adaptive UL communication or UL retransmission) for PUSCH of the SCell is transmitted, is set to ABS, and if DL SF (for example, DL SF #n) of the SCell located at the same time is set to non-ABS, the eNB may transmit a PHICH (or UL grant on PDCCH for channel adaptive UL communication or UL retransmission) for PUSCH of the SCell by using "control region of SCell" or "data region of SCell" not the control region of the PCell. In this case, the PHICH or PDCCH transmitted through the data region will be referred to as enhanced-PHICH (E-PHICH) or E-PDCCH.

In this case, if the eNB transmits a PHICH for PUSCH transmission of the SCell subjected to cross carrier scheduling through the control region of the SCell or the data region of the SCell, the eNB may transmit information (hereinafter, referred to as information T) on a changed method for receiving a PHICH not the existing method for receiving a PHICH and application timing through a physical control channel (for example, specific field (for example, CIF or UL index) of PDCCH or additionally defined field) or physical data channel or upper layer signaling.

As an implementation example, the timing when the eNB transmits the information T to the user equipment UE through a previously designated channel may be the corresponding DL SF (for example, PDCCH (that is, UL grant) of the PCell transmitted for PUSCH scheduling information of the SCell for DL SF #j of the FDD system) of the PCell that schedules PUSCH (for example, PUSCH of the SCell transmitted for UL SF #(j+4) of the FDD system) of the SCell.

In another way, the user equipment UE may know the transmission timing (that is, DL SF #n) of the base station, which transmits a PHICH (or UL grant on PDCCH for channel adaptive UL communication or UL retransmission) for the PUSCH of the SCell subjected to cross carrier scheduling by using "the control region of SCell" or "the data region of SCell" not the control region of the PCell, by using the information W described in the first embodiment. In the same manner as the first embodiment, the timing for reconfiguration or update of the information W previously signaled from the eNB to the UE may be limited to "the case where the existing information W is not effective any more as ABS pattern of a specific cell is changed", or "the case where the existing information W is not effective any more as a set of cells allocated to a specific UE is reconfigured."

In still another way, the eNB may notify the user equipment UE of ABS pattern per cell through upper layer signaling, thereby notifying the UE of information on the transmission timing of the eNB that transmits a PHICH (or UL grant on PDCCH for channel adaptive UL communication or UL retransmission) for the PUSCH of the SCell subjected to cross carrier scheduling by using "the control region of SCell" or "the data region of SCell" not the control region of the PCell.

In the meantime, if the base station transmits a PHICH (or UL grant on PDCCH for channel adaptive UL communication or UL retransmission) for the PUSCH of the SCell subjected to cross carrier scheduling by using "the data region of SCell", the base station may transmit corresponding information from the (existing) physical data transmission region by using a new control channel format defined as E-PHICH (or E-PDCCH). For example, the eNB may notify the user equipment of information on a resource allocation region used for E-PHICH (or E-PDCCH) transmission on the (existing) physical data transmission region, through upper layer signaling or physical layer channel.

In further still another way, if the cross carrier scheduling scheme is used, the eNB may notify the UE of PDSCH starting point of SCells through RRC signaling (hereinafter, referred to as signaling X). In this case, the eNB may configure a resource region required for E-PHICH (or E-PDCCH) transmission by notifying the UE of additional signaling Y in addition to signaling X. For another example, a rule may be established in such a manner that the value of the signaling Y may implicitly be set to a value previously set between the eNB and the UE (without additional signaling). For example, if the value of the signaling X is set to 3 and the value of the signaling Y is set to 2, except for two front DL symbols (that is, DL symbols #0 and #1), following DL symbols #2 and #3 are used for E-PHICH (or E-PDCCH) transmission. In this case, the E-PHICH (or E-PDCCH) for the PUSCH of the SCell may be transmitted using a method for configuring a PHICH (or PDCCH) resource (that is, resource associated with the lowest PRB index of the PUSCH) of the existing legacy UE or a newly defined method for configuring a PHICH (or PDCCH) resource.

Even in the case that the base station transmits a PHICH (or UL grant on PDCCH for channel adaptive UL communication or UL retransmission) for the PUSCH of the SCell subjected to cross carrier scheduling by using "the control region of SCell", the PHICH for the PUSCH of the SCell may be transmitted using a method for configuring a PHICH (or PDCCH) resource (that is, resource associated with the lowest PRB index of the PUSCH) of the existing legacy UE or a newly defined method for configuring a PHICH (or PDCCH) resource.

B) If DL SF (for example, DL SF #n) of the PCell, to which a PHICH (or UL grant on PDCCH for channel adaptive UL communication or UL retransmission) for PUSCH of the SCell subjected to cross carrier scheduling is transmitted, is set to ABS, and if DL SF (for example, DL SF #n) of the SCell located at the same time is set to ABS, the user equipment UE may report ACK to its upper layer after assuming that PUSCH transmission has been performed successfully without performing a PHICH (UL grant on PDCCH for channel adaptive UL communication or UL retransmission) decoding operation for a corresponding DL SF of the PCell. In other words, the user equipment UE performs an operation for halting associated UL HARQ process.

In this case, the eNB may notify the user equipment UE of related information (hereinafter, referred to as information R) through physical control channel (for example, specific field (for example, CIF or UL index) or additionally defined filed of the PDCCH) or physical data channel or upper layer signaling, whereby the user equipment UE may be operated as above for the aforementioned DL SF (that is, DL SF #n), that is, may report ACK to its upper layer after assuming that PUSCH transmission has been performed successfully without performing a PHICH (or UL grant on PDCCH for channel adaptive UL communication or UL retransmission) decoding operation for the corresponding DL SF of the PCell.

For example, the transmission timing when the eNB transmits the information R to the UE through a previously designated channel may be the corresponding DL SF (for example, PDCCH (that is, UL grant) of the PCell transmitted for PUSCH scheduling information of the SCell for DL SF #i of the FDD system) of the PCell that performs cross carrier scheduling for a PUSCH (for example, PUSCH of the SCell transmitted for UL SF #(i+4) of the FDD system) of the SCell.

In another way, the eNB may previously notify the user equipment UE of information on SF set, which includes DL SF (for example, DL SF #n) of the PCell, which is set to ABS on the basis of ABS pattern per cell and DL SF (for example, DL SF #n) of the SCell located at the same time, which is set to non-ABS, or information (hereinafter, referred to as information Q) on SF set, which includes DL SF (for example, DL SF #n) of the PCell, which is set to ABS, and DL SF (for example, DL SF #n) of the SCell located at the same time, which is set to non-ABS, in the form of a bitmap through upper layer signaling or physical layer channel. Accordingly, the user equipment UE may know the transmission timing (that is, DL SF #n) in a way that the UE reports ACK to its upper layer after assuming that PUSCH transmission has been performed successfully without performing a PHICH (or UL grant on PDCCH for channel adaptive UL communication or UL retransmission) decoding operation on the basis of the information Q.

In this case, the timing of reconfiguration or update of the information Q previously signaled from the eNB to the UE may be limited to "the case where the existing information Q is not effective any more as ABS pattern of a specific cell is changed", or "the case where the existing information Q is not effective any more as a set of cells allocated to a specific UE is reconfigured."

In still another way, the eNB may notify the user equipment UE of ABS pattern per cell through upper layer signaling, thereby notifying the UE of information on the operation timing in a way that the UE reports ACK to its upper layer after assuming that PUSCH transmission has been performed successfully without performing a PHICH (UL grant on PDCCH for channel adaptive UL communication or UL retransmission) decoding operation.

C) If DL SF (for example, DL SF #n) of the PCell, to which a PHICH (or UL grant on PDCCH for channel adaptive UL communication or UL retransmission) for PUSCH of the SCell subjected to cross carrier scheduling is transmitted, is set to non-ABS, and if DL SF (for example, DL SF #n) of the SCell located at the same time is set to ABS, the user equipment UE may normally receive and decode a PHICH (or UL grant on PDCCH for channel adaptive UL communication or UL retransmission) for PUSCH of the SCell for the corresponding DL SF #n of the PCell.

FIG. 11 is a diagram illustrating a method for HARQ operation according to the second embodiment of the present invention. Particularly, the second embodiment is applied to FIG. 11 under the same status as that of FIG. 10. In more detail, A) of the second embodiment is applied to FIG. 11.

Referring to FIG. 11, the user equipment UE may receive the PHICH for the PUSCH transmitted for UL SF #4 of cell #3 subjected to cross carrier scheduling from the control region or data region of DL SF #8 of cell #2.

Third Embodiment

In the third embodiment of the present invention, if a total number of cells allocated to a specific user equipment are N, a set of non-ABS patterns set to the PCell may be defined as P (that is, $P=S_0$) and a set of non-ABS patterns of SCell #k except for the PCell may be defined as $S_k$ ($0<k \leq (N-1)$). In this case, it may be considered that a set of non-ABS patterns per cell may be designated to form a relation of $S_k \subset P$ ($0<k \leq (N-1)$). If this relation is applied to the embodiment, a downlink HARQ timeline or uplink HARQ timeline of the SCell may be defined on the basis of a union of the non-ABS patterns set to the PCell and the SCell or a union of available uplink SFs associated with the non-ABS patterns set to the PCell and the SCell. For example, if the set (that is, P ($P=S_0$) of the non-ABS patterns set to the PCell (that is, cell #0) and the set (that is, $S_1$) of the non-ABS patterns set to the SCell have a relation of $S_1 \subset P$, the downlink HARQ timeline of the SCell follows the downlink HARQ timeline of the PCell. As another suggestion, if a rule is defined to form a relation of $S_1 \supset P$ between the set (that is, P ($P=S_0$)) of the non-ABS patterns set to the PCell (that is, cell #0) and the set (that is, $S_i$) of the non-ABS patterns set to the SCell, the downlink HARQ timeline of the SCell follows the downlink HARQ timeline of the SCell. As still another suggestion, if a union of the set (that is, P ($P=S_0$)) of the non-ABS patterns set to the PCell (that is, cell #0) and the set (that is, $S_1$) of the non-ABS patterns set to the SCell is the same as downlink subframe configuration on a specific uplink-downlink configuration which is previously defined, the downlink HARQ timeline of the SCell follows a downlink HARQ timeline of the corresponding uplink-downlink configuration.

Figure 12:
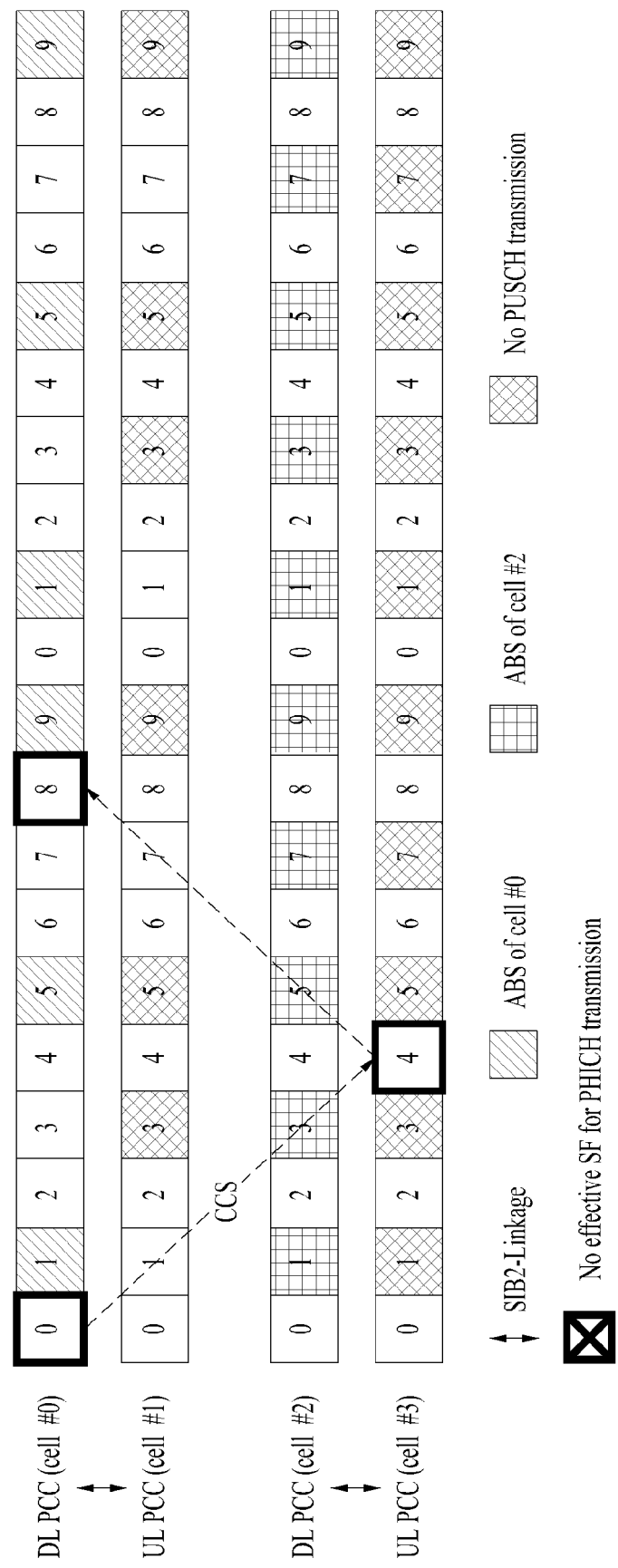
FIG. 12 is a diagram illustrating a method for HARQ operation according to the third embodiment of the present invention.

FIG. 12 is a diagram illustrating a method for HARQ operation according to the third embodiment of the present invention. Particularly, in FIG. 12, the set (that is, P ($P=S_0$)) of the non-ABS patterns set to the PCell (that is, cell #0) and the set (that is, $S_1$) of the non-ABS patterns set to the SCell (that is, cell #2) are designated to have a relation of $S_1 \subset P$. Also, it is assumed that a corresponding PUSCH (based on UL grant received for DL SF #n) is transmitted for UL SF #(n+4) if UL grant is received in the FDD system, that is, DL #n.

Referring to FIG. 12, since the set (that is, P (P=$S_0$)) of the non-ABS patterns set to the PCell (that is, cell #0) and the set (that is, $S_1$) of the non-ABS patterns set to the SCell (that is, cell #2) are designated to have a relation of $S_1 \subset P$, unlike FIG. 10, the user equipment UE may normally receive a PHICH for a PUSCH, which is transmitted for UL SF #4 of cell #3, for DL SF #8 of cell #0.

In the meantime, the third embodiment may be applied to the relation between restrictive channel status information (CSI) measurement sets (for example, subframe set 1 and subframe set 2) per cell as well as the non-ABS patterns per cell.

For example, if a total number of cells allocated to a specific user equipment UE are N, a restrictive CSI measurement set, which is set to the PCell, may be defined as P (that is, P=$S_0$) and a restrictive CSI measurement set of SCell #k except for the PCell may be defined as $S_k$ (0<k≤ (N-1). In this case, the restrictive CSI measurement set per cell may be designated to form a relation of $S_k \supset P$ (0<k≤ (N-1). As additional suggestion, the restrictive CSI measurement set per cell may be designated to form a relation of $S_k \subset P$ (0<k≤(N-1).

Fourth Embodiment

In the fourth embodiment of the present invention, if ABS patterns per cell are designated independently from each other or the same ABS pattern is designated for some cells and different ABS patterns are designated independently for the other cells, a rule may be defined such that the user equipment UE may (virtually and) dynamically change the PCell, which is previously set as an upper layer signal, (for example, in a unit of subframe), whereby the problem of HARQ timing inconsistency per cell (or between cells), which is caused as the ABS patterns per cell are not the same as each other, may be solved effectively. For example, the user equipment UE may dynamically change a scheduling cell, whereby the problem of HARQ timing inconsistency per cell (or between cells), which is caused as the ABS patterns per cell are not the same as each other, may be solved effectively.

An example of the status that needs to (virtually and) dynamically change the existing PCell (that is, cell #0) designated for the user equipment UE includes a case where a specific DL SF #n of the PCell is set to ABS although a control signal (for example, PHICH, DL grant, UL grant, etc.) associated with PDSCH or PUSCH Of the scheduled SCell should be transmitted through the corresponding specific DL SF #n of the PCell when the PDSCH or PUSCH of the SCell is scheduled by the PCell through cross carrier scheduling. Additionally, an example of the status that needs to (virtually and) dynamically change the existing PCell (that is, cell #0) designated for the user equipment UE includes a case where a specific UL SF #n of the PCell cannot be used for transmission of a physical control channel or physical data channel as DL SF of the PCell associated with the corresponding UL SF #n is set to ABS although a control signal (for example, UL ACK/NACK) associated with PDSCH of the scheduled SCell should be transmitted through the corresponding specific UL SF #n of the PCell when the PDSCH of the SCell is scheduled by the PCell through cross carrier scheduling.

Also, among SCells except for the existing PCell, the SCell dynamically changed to a new PCell may be "the SCell having the smallest cell index set by RRC and at the same time the corresponding DL SF #n of the SCell is the available DL SF (for example, non-ABS)".

In another way, among SCells except for the existing PCell, a range of the SCell that may dynamically be changed to a new PCell may be limited to "SCells set to be subjected to cross carrier scheduling by the PCell through RRC" or "all the SCells allocated to the user equipment UE, except for the existing PCell".

Also, the eNB may notify the user equipment UE of the ABS patterns per cell through upper layer signaling, thereby notifying the UE of information on the operation timing according to the fourth embodiment.

Additionally, in order to notify the user equipment UE of the operation according to the fourth embodiment, the eNB may explicitly notify the user equipment of related information through upper layer signaling or physical layer channel (for example, a specific field (for example, CIF, UL index) of PDCCH or additionally defined field). In this case, the information may be signaling of minimum 1 bit size. Alternatively, the operation rule related to the fourth embodiment may previously be shared between the eNB and the UE, whereby the operation rule may implicitly be applied to the corresponding status later.

As another method, even though the specific SCell is (virtually and) dynamically changed to a new PCell in the fourth embodiment, it may be limited that some control signal (for example, PHICH (UL grant) or DL grant or UL ACK/NACK) transmitted from the existing PCell is only transmitted to the newly selected PCell. In this case, a rule may be established such that the control signal which is not transmitted through the newly selected PCell is transmitted through the existing PCell.

Figure 13:
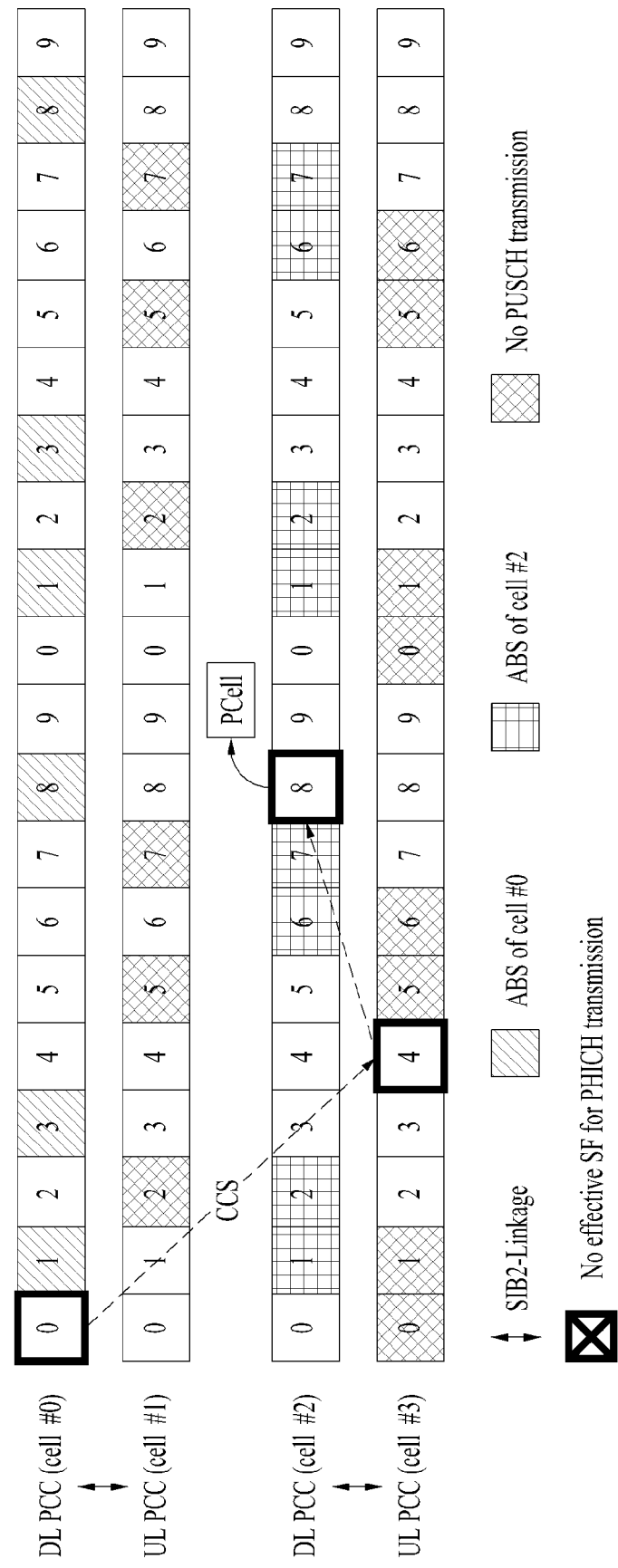
FIG. 13 is a diagram illustrating a method for HARQ operation according to the fourth embodiment of the present invention.

FIG. 13 is a diagram illustrating a method for HARQ operation according to the fourth embodiment of the present invention. Particularly, the fourth embodiment is applied to FIG. 13 under the same status as that of FIG. 10.

Referring to FIG. 13, the user equipment UE may receive the PHICH for the PUSCH, which is transmitted for UL SF #4 of cell #3 subjected to cross carrier scheduling, for DL SF #8 of cell #2 dynamically selected as a new PCell.

Fifth Embodiment

In the fifth embodiment of the present invention, the eNB respectively defines a subframe set (hereinafter, referred to as set A) to which cross carrier scheduling is applied and a subframe set (hereinafter, referred to as set B) to which cross carrier scheduling is not applied, and notifies the user equipment UE of the defined subframe sets through upper layer signaling. In this case, the user equipment UE that has received the information on the set A and the set B may regard that a cross carrier scheduling operation is performed from the PCell (or scheduling cell previously set through upper layer signal) at the SF location designated to the set A and a normal link carrier scheduling operation is performed using a corresponding SCell at the SF location designated to the set B.

The first embodiment to the fifth embodiment of the present invention may be applied to a backhaul link (that is, Un link) environment between the user equipment UE and a relay node RN by setting a restriction to Un SF configuration. Also, the first embodiment to the fifth embodiment of the present invention may be applied to the FDD system or the TDD system, to which a carrier aggregation scheme is applied.

Also, the first embodiment to the fifth embodiment of the present invention may be applied to a case where extension carrier is used for transmission of a physical control channel or physical data channel in accordance with the carrier aggregation scheme.

Additionally, the first embodiment to the fifth embodiment of the present invention may be applied to various cases where a control signal (for example, PHICH, DL grant, UL grant, etc.) associated with the PDSCH or PUSCH of the scheduled cell is not transmitted to the corresponding DL SF #n of the PCell when the PDSCH or PUSCH of the SCell is scheduled by the PCell through cross carrier scheduling. Also, the first embodiment to the fifth embodiment of the present invention may be applied to various cases where a control signal (for example, UL ACK/NACK) associated with the PDSCH of the scheduled cell is not transmitted to the corresponding UL SF #n of the PCell when the PDSCH of the SCell is scheduled by the PCell through cross carrier scheduling.

The first embodiment to the fifth embodiment of the present invention may be applied to a case where an unlicensed band is used for transmission of a physical control channel or physical data channel (on the basis of carrier sensing) in accordance with the carrier aggregation scheme.

Figure 14:
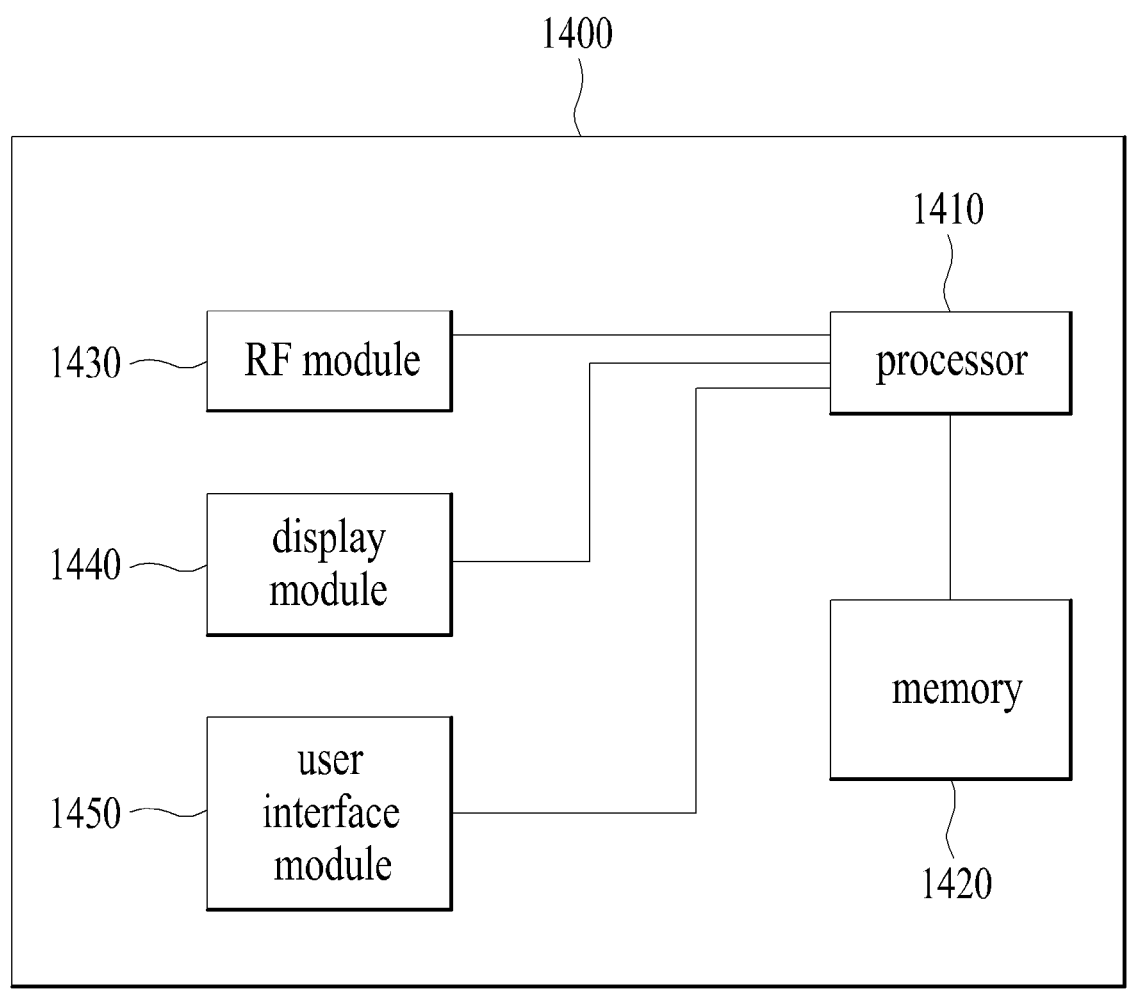
FIG. 14 is a block diagram illustrating a communication device according to one embodiment of the present invention.

FIG. 14 is a block diagram illustrating a communication device according to one embodiment of the present invention.

Referring to FIG. 14, the communication device 1400 includes a processor 1410, a memory 1420, a radio frequency (RF) module 1430, a display module 1440, and a user interface module 1450.

The communication device 1400 is illustrated for convenience of description, and some of its modules may be omitted. Also, the communication device 1400 may further include necessary modules. Moreover, some modules of the communication device 1400 may be divided into segmented modules. The processor 1410 is configured to perform the operation according to the embodiment of the present invention illustrated with reference to the drawings. In more detail, a detailed operation of the processor 1410 will be understood with reference to the disclosure described with reference to FIG. 1 to FIG. 13.

The memory 1420 is connected with the processor 1410 and stores an operating system, an application, a program code, and data therein. The RF module 1430 is connected with the processor 1410 and converts a baseband signal to a radio signal or vice versa. To this end, the RF module 1430 performs analog conversion, amplification, filtering and frequency uplink conversion, or their reverse processes. The display module 1440 is connected with the processor 1410 and displays various kinds of information. Examples of the display module 1440 include, but not limited to, a liquid crystal display (LCD), a light emitting diode (LED), and an organic light emitting diode (OLED). The user interface module 1450 is connected with the processor 1410, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method and device for allowing a user equipment to execute uplink hybrid automatic repeat and request (HARQ) operation in a wireless communication system have been described based on the 3GPP LTE system, they may be applied to various wireless communication systems in addition to the 3GPP LTE system.

The invention claimed is:

1. A method for receiving an acknowledgement/negative-ACK (ACK/NACK) signal from a base station at a user equipment in a wireless communication system, the method comprising:
    receiving, from the base station, Almost Blank Subframe (ABS) pattern information of a first carrier;
    receiving, from the base station, through the first carrier, scheduling information on uplink data to be transmitted through a second carrier;
    transmitting the uplink data to the base station through the second carrier; and
    receiving an ACK/NACK signal for the uplink data from the base station through a specific subframe of a carrier among the first carrier and a third carrier,
    wherein the carrier for receiving the ACK/NACK signal is determined based on the ABS pattern information indicating whether or not the specific subframe of the first carrier is an ABS, and wherein, when the specific subframe of the first carrier is a non-ABS, the ACK/NACK signal is received via a Physical hybrid ARQ Control Channel (PHICH) on a control region of the specific subframe of the first carrier.

2. The method according to claim 1, further comprising:
receiving, from the base station, ABS pattern information of a third carrier; and
determining whether or not the specific subframe of the third carrier is an ABS.

3. The method according to claim 2, further comprising:
when the specific subframe of the first carrier and the specific subframe of the third carrier are the ABS, assuming that the uplink data is successfully transmitted to the base station without decoding the ACK/NACK signal.

4. The method according to claim 1, wherein the ABS pattern information is transmitted to the user equipment by upper layer signaling.

5. The method according to claim 1, the method further comprising receiving information on a timing when the ACK/NACK signal will be received for the specific subframe on the third carrier, from the base station.

6. A method for transmitting an acknowledgement/negative-ACK (ACK/NACK) signal to a user equipment at a base station in a wireless communication system, the method comprising:
transmitting, to the user equipment, Almost Blank Subframe (ABS) pattern information of a first carrier;
transmitting, to the user equipment, through the first carrier, scheduling information on uplink data to be received through a second carrier;
receiving the uplink data from the user equipment through the second carrier; and
transmitting an ACK/NACK signal for the uplink data to the user equipment through a specific subframe of a carrier among the first carrier and a third carrier,
wherein the carrier for transmitting the ACK/NACK signal is determined based on the ABS pattern information indicating whether or not the specific subframe of the first carrier is an ABS, and
wherein, when the specific subframe of the first carrier is a non-ABS, the ACK/NACK signal is received via a Physical hybrid ARQ Control Channel (PHICH) on a control region of the specific subframe of the first carrier.

7. The method according to claim 6, further comprising:
transmitting, to the user equipment, ABS pattern information of a third carrier.

8. The method according to claim 7, wherein, when the specific subframe of the first carrier is the ABS, the ACK/NACK signal is transmitted via an advanced-PHICH on a data region of the specific subframe of the third carrier.

9. The method according to claim 6, wherein the ABS pattern information is transmitted to the user equipment by upper layer signaling.

10. The method according to claim 6, the method further comprising transmitting information on a timing when the ACK/NACK signal will be received for the specific subframe on the third carrier, to the user equipment.

11. A user equipment for receiving an acknowledgement/negative-ACK (ACK/NACK) signal from a base station, the user equipment comprising:
a radio frequency (RF) module configured to transmit/receive signals to/from the base station; and
a processor connected with the RF module and configured to control the RF module to:
receive, from the base station, Almost Blank Subframe (ABS) pattern information of a first carrier,
receive, from the base station, through the first carrier, scheduling information on uplink data to be transmitted through a second carrier;
transmit the uplink data to the base station through the second carrier; and
receive an ACK/NACK signal for the uplink data from the base station through a specific subframe of a carrier among the first carrier and a third carrier,
wherein the carrier for receiving the ACK/NACK signal is determined based on the ABS pattern information indicating whether or not the specific subframe of the first carrier is an ABS, and
wherein, when the specific subframe of the first carrier is a non-ABS, the ACK/NACK signal is received via a Physical hybrid ARQ Control Channel (PHICH) on a control region of the specific subframe of the first carrier.

12. A base station for transmitting an acknowledgement/negative-ACK (ACK/NACK) signal to a user equipment at a base station in a wireless communication system, the base station comprising:
a radio frequency (RF) module configured to transmit/receive signals to/from the user equipment; and
a processor connected with the RF module and configured to control the RF module to:
transmit, to the user equipment, Almost Blank Subframe (ABS) pattern information of a first carrier,
transmit, to the user equipment, through the first carrier, scheduling information on uplink data to be received through a second carrier;
receive the uplink data from the user equipment through the second carrier; and
transmit an ACK/NACK signal for the uplink data to the user equipment through a specific subframe of a carrier among the first carrier and a third carrier,
wherein the carrier for transmitting the ACK/NACK signal is determined based on the ABS pattern information indicating whether or not the specific subframe of the first carrier is an ABS, and
wherein, when the specific subframe of the first carrier is a non-ABS, the ACK/NACK signal is transmitted via a Physical hybrid ARQ Control Channel (PHICH) on a control region of the specific subframe of the first carrier.

13. The method according to claim 1, wherein a subframe number of each specific subframe of the first carrier and the third carrier are same.

14. The method according to claim 1, wherein when the specific subframe of the first carrier is the ABS, the ACK/NACK signal is received via an advanced-PHICH on a data region of the specific subframe of the third carrier.

* * * * *